(No Model.) 7 Sheets—Sheet 1.

T. CARNEY.
CASH REGISTER AND INDICATOR.

No. 473,170. Patented Apr. 19, 1892.

Witnesses

Inventor:
Thomas Carney
by Peek & Rector
his Attorneys.

(No Model.)

7 Sheets—Sheet 2.

T. CARNEY.
CASH REGISTER AND INDICATOR.

No. 473,170.

Patented Apr. 19, 1892.

Witnesses.
J. Thomson Cross
E. W. Kudinghaus

Inventor:
Thomas Carney
by Peck & Reth
his Attorneys.

(No Model.)  7 Sheets—Sheet 3.
T. CARNEY.
CASH REGISTER AND INDICATOR.

No. 473,170. Patented Apr. 19, 1892.

Witnesses.
J Thomson Cross
E W Hardinghaus

Inventor:
Thomas Carney
by Peck & Reeter
his Attorneys.

(No Model.)  7 Sheets—Sheet 4.

T. CARNEY.
CASH REGISTER AND INDICATOR.

No. 473,170. Patented Apr. 19, 1892.

Witnesses:
J. Thomson Cross
E. W. Hardinghaus

Inventor:
Thomas Carney
by Peck & Peck
Attorneys.

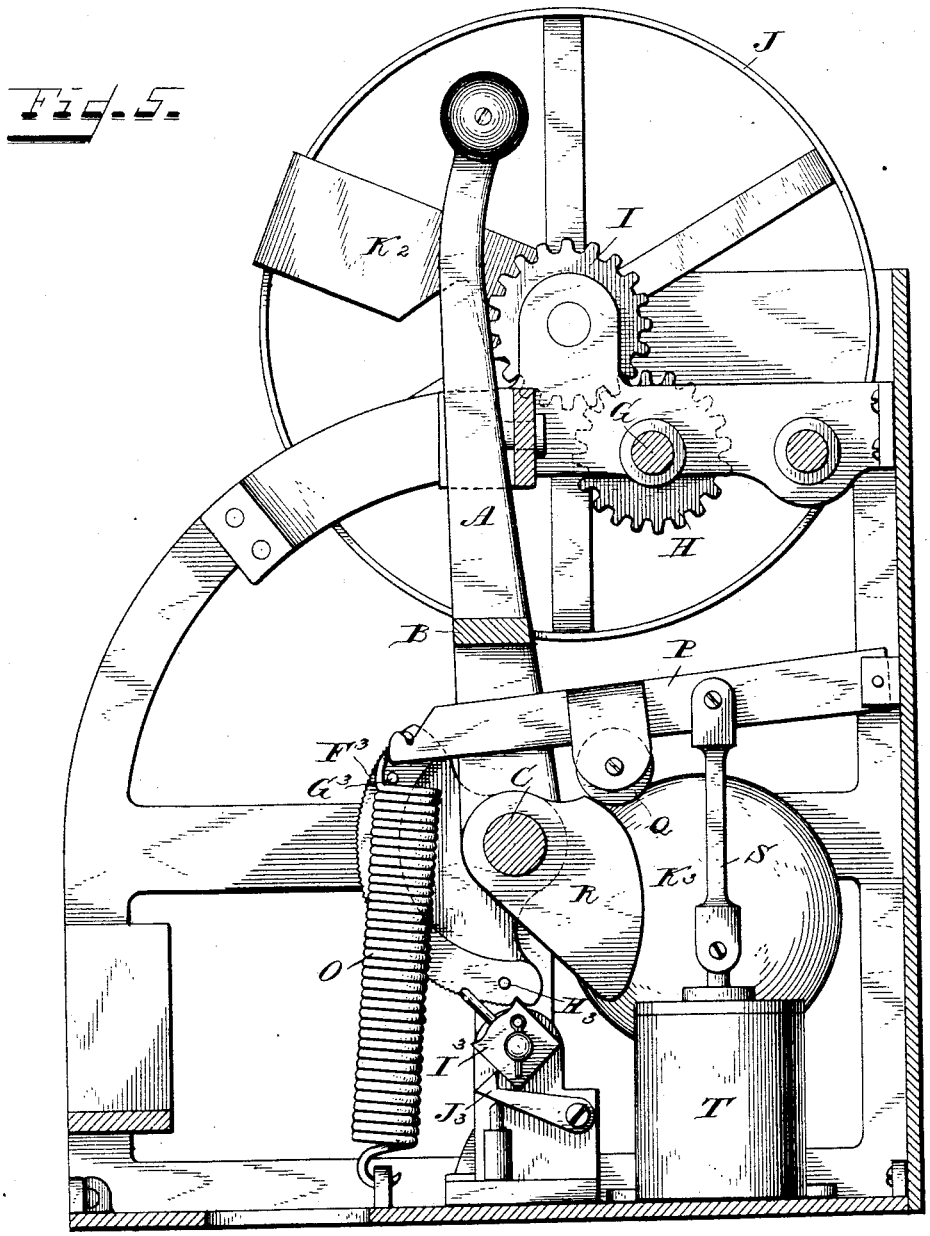

(No Model.) 7 Sheets—Sheet 6.
T. CARNEY.
CASH REGISTER AND INDICATOR.
No. 473,170. Patented Apr. 19, 1892.
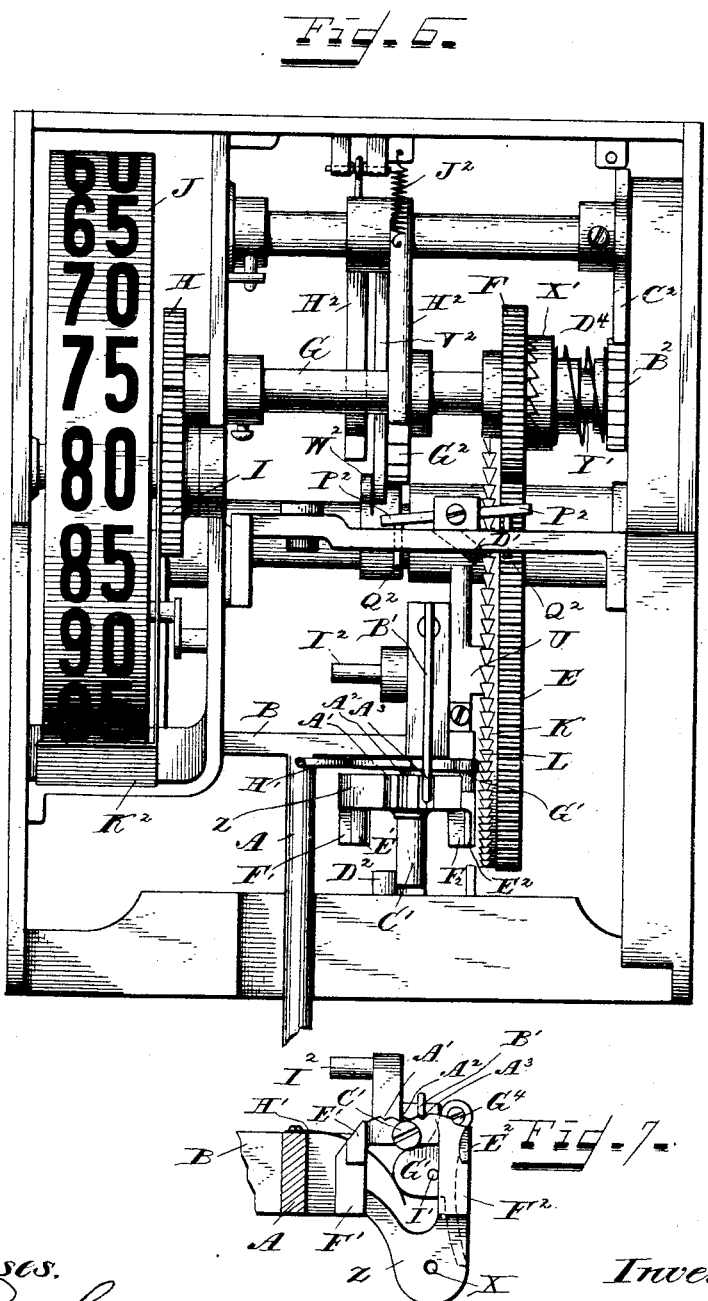

(No Model.)  7 Sheets—Sheet 7.
T. CARNEY.
CASH REGISTER AND INDICATOR.
No. 473,170.  Patented Apr. 19, 1892.
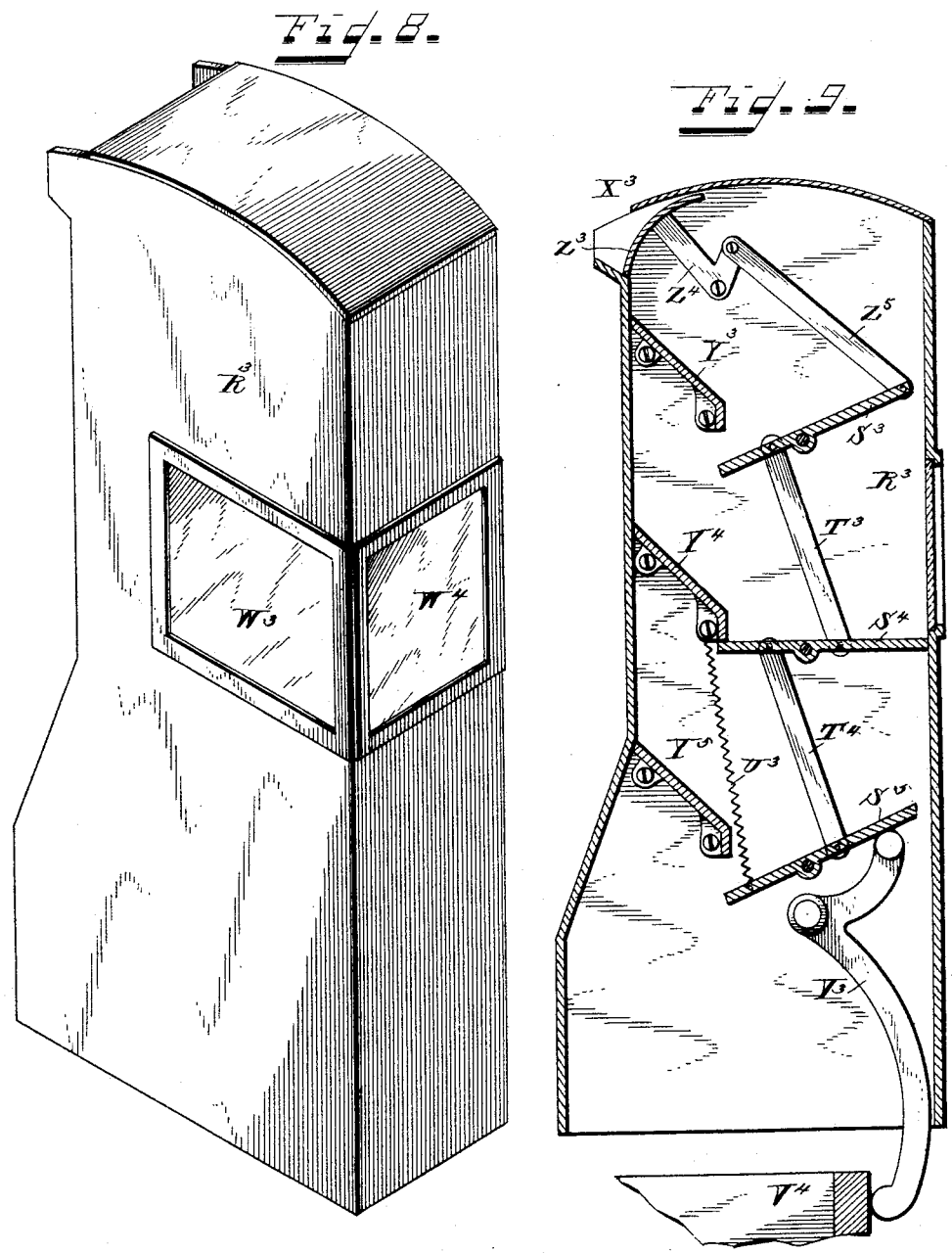
Witnesses.
J. Thomson Cross
E. W. Hardinghaus
Inventor
Thomas Carney
by Peck & Reeta
his Attorneys.

UNITED STATES PATENT OFFICE.

THOMAS CARNEY, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 473,170, dated April 19, 1892.

Application filed December 16, 1891. Serial No. 415,212. (No model.)

*To all whom it may concern:*

Be it known that I, THOMAS CARNEY, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My invention consists in the novel construction, arrangement, combinations, and modes of operations of the various parts of the machine, which will be hereinafter described, and specifically set forth in the claims.

Figure 1:
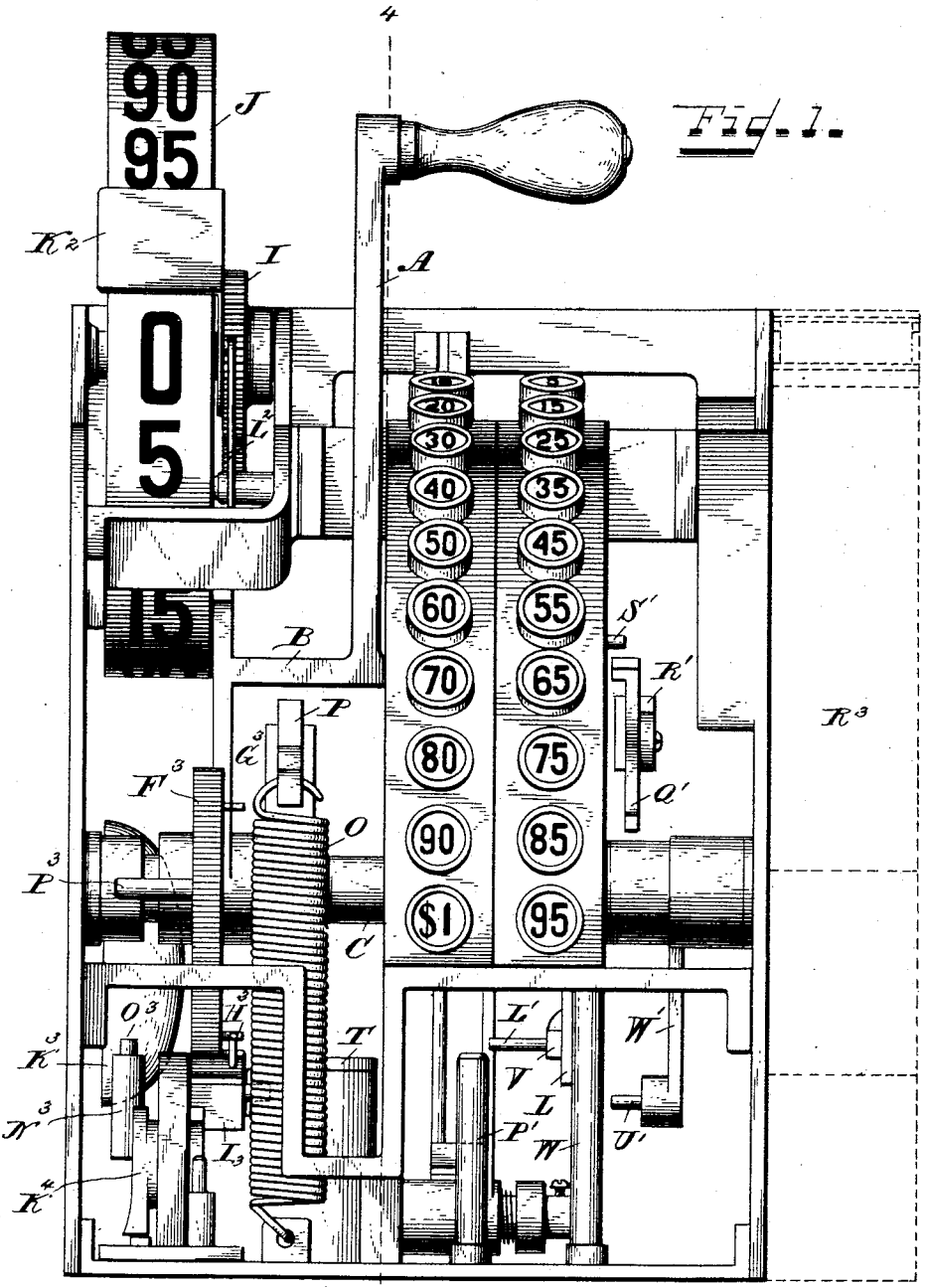
Figure 2:
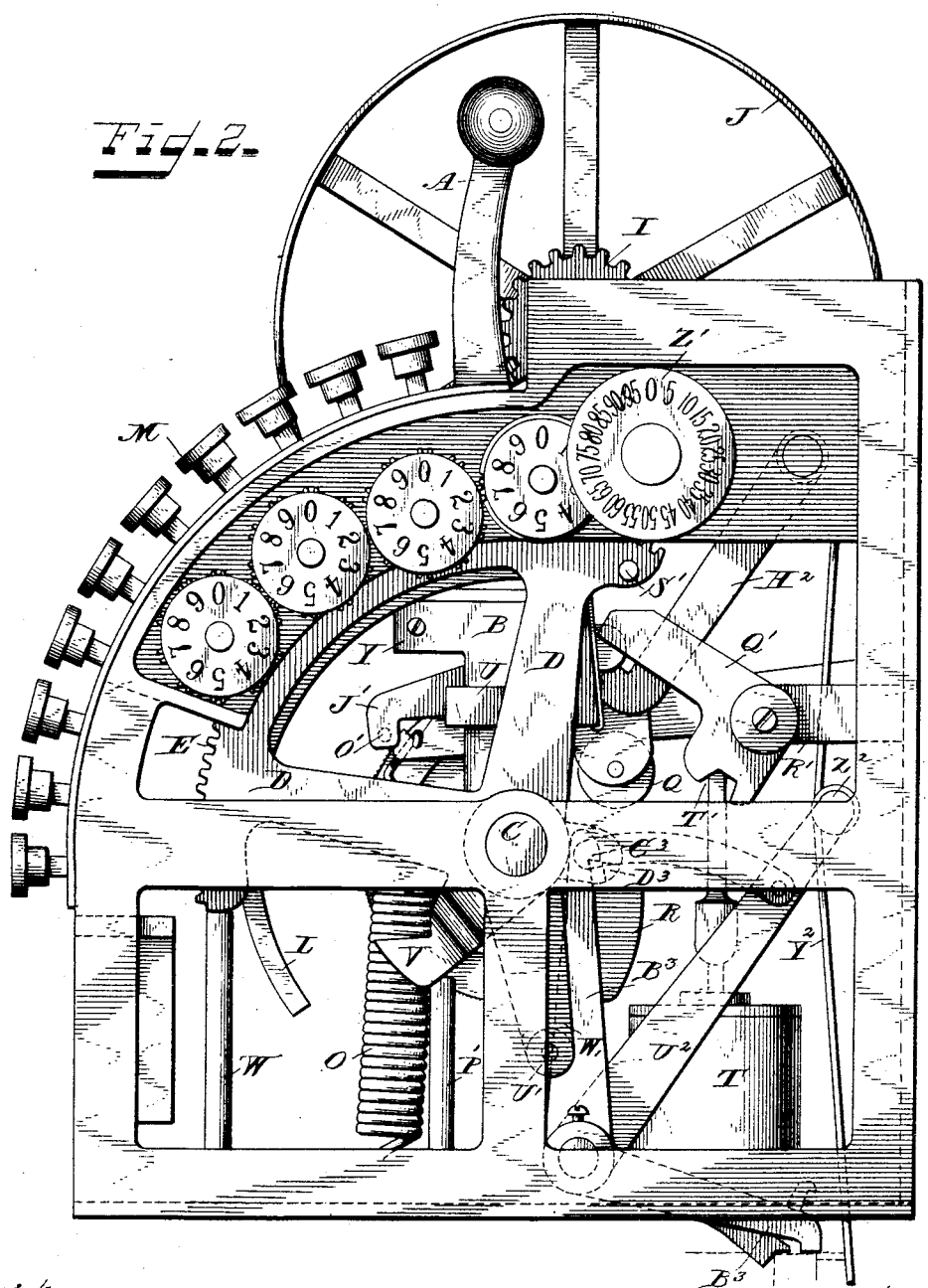
Figure 3:
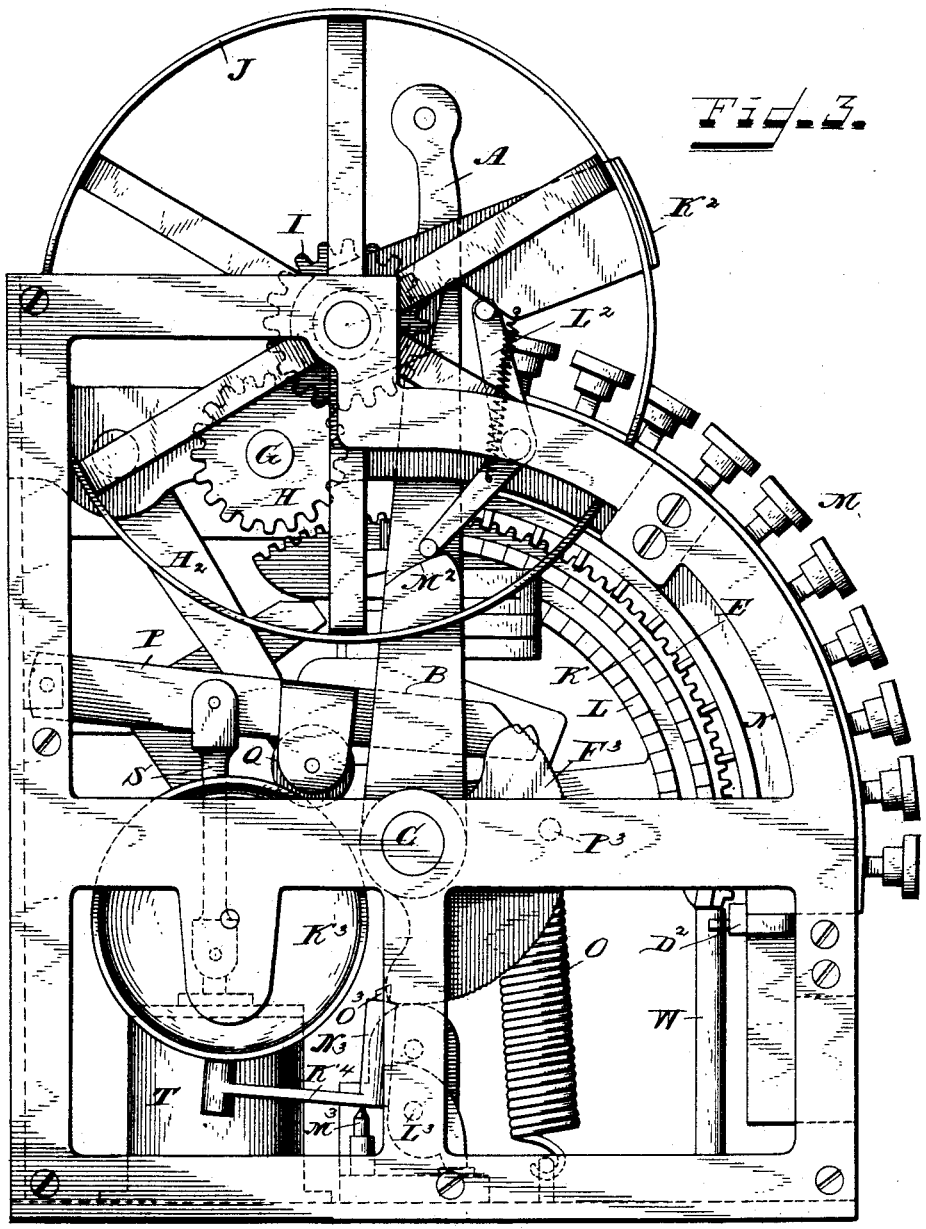
Figure 4:
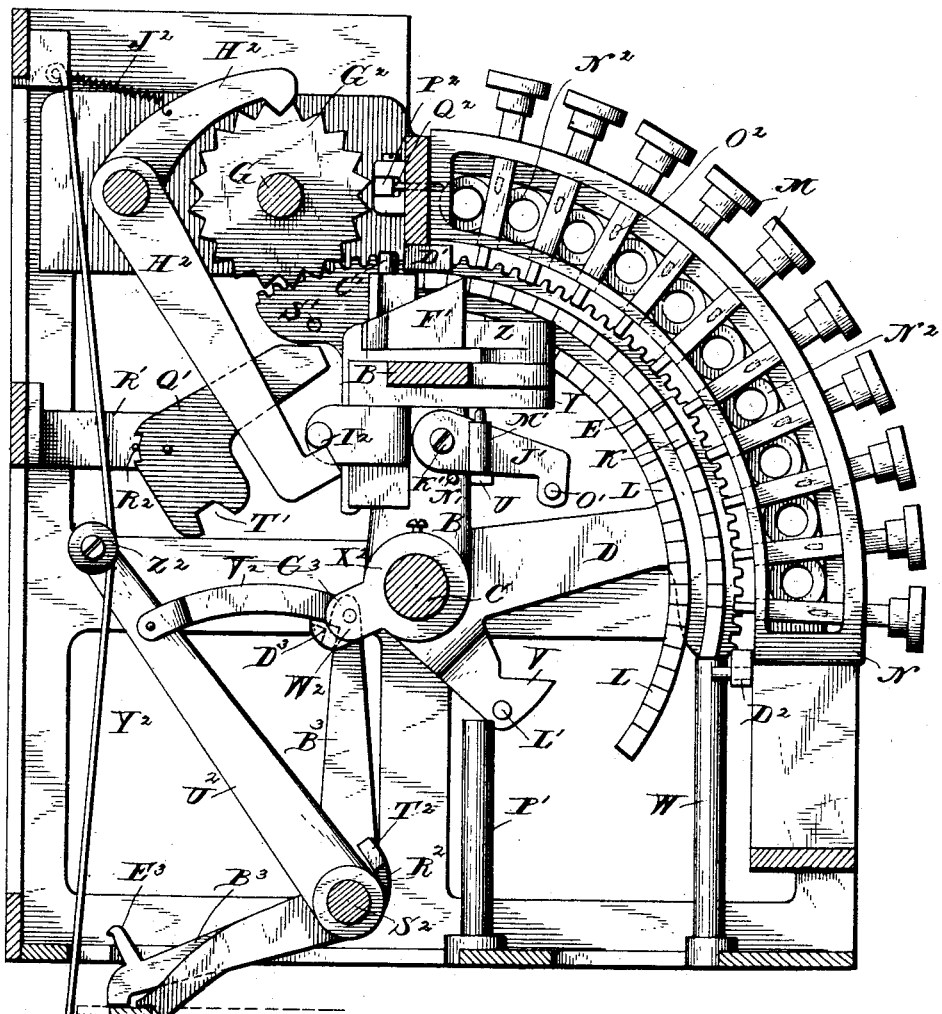

In the accompanying drawings, Figure 1 represents a front elevation of my new machine; Fig. 2, an elevation of the right side thereof; Fig. 3, an elevation of the left side thereof; Fig. 4, a vertical section on the line 4 4 of Fig. 1, looking toward the right; Fig. 5, a vertical section on the same line, looking toward the left; Fig. 6, a top plan view with some of the parts removed to expose others and the operating-handle thrown down to a horizontal position; Fig. 7, a plan view of the pawls and associated devices mounted on the swinging frame; Fig. 8, a perspective view of the coin-exposing contrivance, and Fig. 9 a vertical section of the same.

The same letters of reference are used to indicate identical parts in all the figures.

Power is applied to the machine by means of an operating-handle A, which is secured upon or formed integral with and projects outwardly from a swinging frame or yoke B, which is fast upon a central rock-shaft C, the handle and frame constituting a lever having the axis of the shaft C as its fulcrum. At each operation of the machine this handle is pulled forward and downward to its limit of stroke, which is a little more than one-quarter of a revolution about the axis of the shaft C, and is then returned to normal position, thereby rocking the shaft C forward and back a corresponding portion of a revolution.

Loosely mounted upon the shaft C by radial arms D, beside the frame B, is a gear-toothed segment E, Figs. 2, 3, 4, and 6. This segment meshes with a gear-wheel F, fast upon a shaft G, Fig. 6. Fast upon the shaft G at its left-hand end is another gear H, which meshes with a gear I, fast upon the hub of the indicator-wheel J. In this manner the movements of the segment E in both directions are transmitted to the indicator-wheel. Upon the inner face of the segment E are formed or secured two concentric ratchets K and L, Figs. 3, 4, and 6, the former having downwardly-facing teeth and the latter upwardly-facing teeth, and the latter in this instance projecting farther from the face of the segment than the former.

The frame B carries a pawl, to be presently described, which co-operates with the ratchet K and with the two rows of stops or keys M, the stops operating to throw the pawl into engagement with the ratchet K at different points in the stroke of the operating-handle to cause the pawl to turn the segment and indicator-wheel different distances, according to the position of the particular stop which may be thrown into co-operation with the pawl.

The ratchet L is a locking-ratchet, which co-operates with another pawl carried by the swinging frame B in a manner hereinafter described.

The keys or stops M consist of pins mounted to move inward and outward in bores in the segmental guide-plates N, being yieldingly retained in either position to which they may be moved by the friction between them and their guides or otherwise. These pins are preferably square in cross-section, excepting their inner ends, which co-operate with the pawl, which are round. Their outer ends carry the usual numbered push-buttons, representing in this instance multiples of five from five to one hundred. When the keys are in their outer position, their inner ends are out of the path of travel of the pawl; but when any one of them is pushed inward its inner end is moved into the path of the pawl and operates, in the manner hereinafter described, to throw the pawl into engagement with the ratchet K upon the segment E.

A full operation of the machine consists in pressing in one of the keys M and then pulling the handle A forward and downward to its limit of stroke and then releasing it, whereupon it is returned to normal position by a spring. This spring is shown in Fig. 5 as a strong coiled spring O, secured at its lower end to the frame-work of the machine and at its upper end to the front end of a lever P, which is pivoted at its rear end to the frame-work. This lever carries a friction-roller Q, which bears upon a cam R, fast upon the shaft C. When the handle A is pulled forward, this cam lifts the lever P and puts the spring O under tension, so that when the handle is given its full stroke and released the spring forces the cam R downward again and restores the handle to normal position. A link S connects the lever P with the piston-rod of the usual speed-retarding contrivance T, consisting of a closed cylinder filled with oil and containing a piston, which is either perforated or does not tightly fit the cylinder, so that it can move back and forth in the cylinder slowly and not rapidly, the oil escaping from in front of the piston through its perforations or around its sides as the piston moves in each direction. This contrivance prevents the handle being pulled forward or thrown back too rapidly.

During the forward and downward movement of the handle A and frame B the actuating-pawl carried by the frame is clear of the ratchet K upon the segment, and this stroke of the handle is utilized simply to pick up the segment wherever it may have been left by the previous operation of the machine and carry it on forward and downward to the position shown in the drawings, in which position of the segment the indicator-wheel, which is geared to it, stands at zero, as seen in Fig. 1. For this purpose a block U is secured or formed upon the side of the frame B, Fig. 2, and this block co-operates with an arm V, projecting downwardly and forwardly from the hub of the segment. The lower end of this arm is bent to the left, Fig. 1, so as to lie in the path of the block U, and is shaped to afford a suitable contact-surface for said block. If when the segment is in the position shown in the drawings with the indicator-wheel at zero the handle A and frame B are given their full forward stroke, the block U will rest against or immediately above the contact-surface of the arm V when such stroke is completed. If, however, when the forward stroke of the handle is begun the segment is not in the position shown in the drawings, but is standing at some point at which it has been left in indication of the preceding sale, the block U in the forward movement of the handle will engage the arm V wherever it happens to be, and thereby pick up the segment and carry it on with it to the position shown in the drawings, thus returning the indicator-wheel to zero. In this position of the parts the lower end of the segment rests upon the top of a post W, extending upward from the bottom of the frame-work.

It will be understood that, instead of the block U upon the frame B to engage the segment and restore it to normal position, any other suitable device moving forward with the operating-handle and frame B and arranged to engage the segment E might be employed. Thus a separate arm fast upon the shaft C might be arranged to engage the rear supporting-arm D of the segment for the same purpose.

I will now describe the pawls carried by the frame B and the manner of their co-operation with the keys M and with the ratchets K and L on the segment E: first, the actuating-pawl, which co-operates with the ratchet K, and then the locking-pawl, which co-operates with the ratchet L. Pivotally mounted at X upon a bearing Y, projecting forward from the upper right-hand corner of the frame B, Figs. 2 and 4, is a rocking plate or frame Z, Figs. 4, 6, and 7. The upper end of this plate in Fig. 7 (the rear end when the handle is in normal position, as in Fig. 4) is free to swing right and left upon the pivotal support of the plate at X. The upper edge of the plate has in it three notches A′, A², and A³, with which co-operates a spring-detent B′ to yieldingly hold the plate in either right, left, or middle position, according to the notch with which the detent is engaged. Projecting upwardly from the plate Z near its upper or rear edge, Figs. 4, 6, and 7, is a stud C′, preferably surrounded by a friction-sleeve. This stud co-operates with two cams or trips D′ and D², with the former at the completion of the return or upward stroke of the handle and with the latter at the end of its forward and downward stroke. The engagement of the stud C′ with the upper cam D′ throws the plate to the left and engages the notch A³ with the spring-detent B′, while the engagement of the stud with the lower cam D² throws the plate toward the right to a middle position and engages the notch A² with the detent B′. The plate Z is thrown into its extreme right-hand position and the detent B′ engaged with the notch A′ by the keys or stops M, in the manner to be described.

Formed upon the plate Z, one at each of its upper corners, Fig. 7, are two lugs E′ and E². The left-hand side of these lugs are beveled and co-operate with the stops M, the lug E′ with those of the left-hand row and the lug E² with those of the right-hand row. The right-hand lug E² constitutes also the pawl, which engages the ratchet K on the segment E when the plate Z is thrown into its extreme right-hand position.

The operation of the parts is as follows: When the plate Z is in its extreme left-hand position, Fig. 7, in which position it always stands at the beginning of the forward movement of the operating-handle, (having been moved there by the engagement of the stud C′ with the cam D′ at the completion of the last return stroke of the handle,) the lugs E′ and E² stand out of the lines of the two rows of stops M to the left of said rows, respectively, so that if a key in either row is pushed in before the handle is pulled forward the lug E' or E² will clear the inner end of such key. When, however, the plate Z is thrown into its middle position by the engagement of the stud C' with the lower cam D² at the completion of the forward stroke of the handle, as before explained, the lugs E' and E² are brought into line with the rows of keys M, so that during the return stroke of the handle the beveled left-hand side of one or the other of the lugs will engage the inner end of the key which has been pressed in, and as it rides past the key the plate Z will be thrown into the extreme right-hand position and the notch A' engaged with the spring-detent B' to yieldingly hold it there. This movement of the plate Z to the right will engage the right-hand pawl-acting face of the lug E² with the ratchet K on the segment E, so that during the further return movement of the handle the segment E will be carried with it. When the handle reaches the end of its return stroke, the stud C' will engage the cam D' and throw the plate Z to the left again and engage the detent B' with the notch A³. The relative positions of the keys in each row determine the distances which the pawl shall move the segment, and consequently the position to which the indicator-wheel J shall be turned. Thus if one of the lower keys in either row be pushed in the plate Z will be thrown to the left and the pawl engaged with the ratchet K earlier in the backward movement of the handle than if the key pushed in be one higher up in the row, the adjustment being such that whichever key is pressed in the pawl will be thrown into engagement with the ratchet K at the proper point to cause the segment in the full backward movement of the handle to be moved just far enough to turn the indicator-wheel to position to expose at the reading-opening the number corresponding to the operated key. Thus if the ninety-five-cent key be pressed in the pawl will be thrown into engagement with the ratchet on the segment at almost the beginning of the backward movement of the handle, so that the full return movement of the handle will turn the indicator-wheel nearly a complete revolution and expose "95" at the reading-opening. If the twenty-five-cent key be the one pressed in, the pawl will not be thrown into engagement with the ratchet until the handle has nearly completed its return movement, so that the segment will be moved only a short distance and the indicator-wheel turned just far enough to expose the number "25" at the reading-opening.

As shown in the drawings, the respective keys in the two rows stand transversely opposite each other, but nevertheless any two keys which are in transverse line with each other will not throw the pawl into engagement with the ratchet at the same point. Owing to the position of the lugs E' and E² on the plate Z, when the plate is thrown into its middle position, (as it always is by the engagement of the stud C' with the cam D² at the end of the forward stroke of the handle), the lug E' on the left will stand in advance of the lug E² on the right, and will consequently engage any key in the left-hand row before the lug E² on the right would engage the opposite key in the right-hand row. Thus the ninety-five-cent and the one-dollar keys stand directly opposite each other, being the lowest keys in their respective rows; but the lug E' on the plate Z will engage the dollar key and throw the pawl into engagement with the ratchet earlier in the return stroke of the handle than the lug E² on the right will engage the ninety-five-cent key, as will be readily understood. After the lug E' or E² has passed by any key which has been pressed in and the pawl been thrown into engagement with the ratchet the key is pushed outward to normal position again by one of two cams F' F², which are located on the plate Z, one immediately behind each of said lugs, as seen in Figs. 4, 6, and 7.

I will next describe the locking-pawl carried by the frame B, which co-operates with the ratchet L on the segment E. This pawl G', as shown in Figs. 6 and 7, lies in the space between the plate Z and the upper surface of the frame B, (shown in Fig. 4,) the plate being also cut away on its under side at the right of its pivotal point X to afford space for the pawl, as indicated by the dotted lines in Fig. 7. It is pivoted at its upper end to the frame B at G⁴. A flat spring H', secured at its left-hand end to the frame B and bearing at its right-hand end against the edge of the pawl, constantly tends to throw the pawl into engagement with the ratchet L on the segment, but is prevented from doing so by a pin I', projecting from the upper surface of the pawl into the recess in the plate Z and bearing against the edge thereof. When the plate Z is in either its left-hand or middle position, this pin prevents the pawl G' being thrown by its spring into engagement with the ratchet L; but when the plate Z is thrown into its right-hand position the wall of the recess against which the pin bears is moved away from it and the spring thereupon throws the pawl to the right, also, and engages it with the ratchet L. It results from this that whenever the plate Z is thrown to the right by an operated key and the actuating pawl or lug E² engaged with the ratchet K of the segment the locking-pawl G' is simultaneously thrown to the right and engaged with the ratchet L, and that when the plate Z is thrown to the left again by the engagement of the stud C' with the cam D' at the end of the return stroke of the handle, and the pawl E² thereby disengaged from the ratchet K, the pawl G' is simultaneously disengaged from the ratchet L. It will therefore be understood that whenever the actuating-pawl is engaged with the segment the operating-handle and frame B become absolutely locked to the segment, so that it would not be possible to move them in either direction without carrying the segment with them. This effectually prevents the segment from running ahead of the operating-handle in the backward movement of the latter by reason of the momentum which might be given it by a very rapid or irregular return of the handle and tends to insure accuracy in the indication and registration.

Another lock between the operating-handle and frame and the segment may be now described. It consists of a hook or latch-arm J', which is pivoted to the frame B at K', Fig. 4, and co-operates with a pin L', projecting laterally from the arm V on the hub of the segment heretofore described. A spring and plug confined in a housing M' on the hook J' and bearing against the under side of the part Y of the frame B yieldingly press the hook downward against a stud N' on the side of the frame. When the handle is started forward, the point of the hook J' will engage and ride over the pin L' on the arm V wherever said arm and the segment may have been left standing by the last operation of the machine, and the segment will thus become hooked to the frame B. This operation takes place at the same time that the block U on the opposite side of the frame B engages the contact-face of the arm V and begins to move the segment forward with it. The segment therefore becomes positively locked to the frame B, so that no matter how rapid or irregular the forward movement of the handle may be the segment cannot run ahead of it. Just as the handle completes its forward movement a pin O', projecting laterally from the side of the hook J' near its outer end, strikes a post P', mounted on the frame-work and disengages the hook from the pin L' on the arm V.

A third lock applied to the segment E is shown in Figs. 1, 2, and 4, and consists of a bell-crank arm or plate Q', pivoted to a support R' upon the frame-work. Its upper end co-operates with a pin S' upon the side of the segment, while its lower end is provided with a notch T', which co-operates with a pin U', projecting laterally from the side of the lower end of an arm W', fast upon the rock-shaft C, Fig. 1. Just as the handle completes its forward stroke the pin U' on the arm W', which has been thrown upward and rearward by the oscillation of the rock-shaft, engages the notch T' in the bell-crank and throws the upper end of the latter up immediately behind the pin S' on the segment. This prevents any backward vibration of the segment in case it should be thrown forward rapidly by the handle and strike the post W violently. A pin $R^2$ upon the support R', Fig. 4, co-operates with shoulders on the bell-crank Q' to limit the movements of the latter.

The registering mechanism of the machine is actuated by the gear F, which meshes with the segment E, Fig. 6. This gear has clutch-teeth formed upon its right-hand side, which teeth mesh with like teeth upon a clutch-collar X', which is feathered on the left-hand end of a sleeve Y', loosely mounted on the shaft G. Fast upon the right-hand end of the sleeve Y', outside the frame-work, Fig. 2, is the primary registering-wheel Z', bearing a series of numbers in multiples of five, from "0" to "95," and which transfers onto the usual train of adding-wheels. Fast on the sleeve Y', inside the frame-work, Fig. 6, is a ratchet-wheel $B^2$, with which co-operates a holding-dog $C^2$ to prevent backward rotation of the sleeve and registering-wheel. A coiled spring $D^4$ is interposed between the ratchet-wheel and the clutch-collar X' and serves to yieldingly press the teeth of the latter into engagement with the clutch-teeth upon the gear F. As the segment E is moved forward and downward during the forward stroke of the handle and return of the indicator-wheel to zero, the clutch-teeth on the gear F slip idly backward over the teeth on the collar X'; but when the segment is turned upward and rearward during the return stroke of the handle and the moving of the indicator-wheel from zero to the new indication the clutch locks the gear to the registering-wheel and the latter moves in unison with the indicator-wheel and registers the amount which the latter indicates.

A toothed locking-wheel $G^2$, fast upon the shaft G, Figs. 4 and 6, co-operates with a locking-tooth upon the upper end of a bell-crank lever $H^2$, to positively arrest and lock the indicator-wheel at the completion of the backward stroke of the operating-handle, a pin $I^2$, carried by the frame B, being arranged to strike the lower end of the bell-crank at such time and throw its upper end into engagement with the wheel $G^2$, as will be understood from Fig. 4. A spring $J^2$, connected at one end to the upper part of the bell-crank and at its other to the frame-work, serves to lift the locking-tooth out of engagement with the wheel $G^2$ as soon as the handle is started forward and the pin $I^2$ moved away from the lower end of the bell-crank and holds it out of engagement until the handle is returned to normal position again.

A movable screen $K^2$, Figs. 1 and 3, co-operates with the indicator-wheel J to hide the numbers thereon while the wheel is being turned to zero and back to the new indication. This screen consists of a plate loosely hung at its rear end upon the hub of the indicator-wheel and having its front end bent at right angles across the front face of the wheel. It will be understood that the working parts of the machine, which are shown in the drawings, are to be inclosed in a suitable casing, and that this casing will be provided with a reading-opening immediately in front of the indicator-wheel, through which opening the numbers on said wheel may be exposed one at a time. The portion of the screen $K^2$ which is in front of the wheel is of sufficient size to cover this opening when dropped down behind it; but when the machine is at rest the screen is held above the opening to expose a number therethrough, as the zero is exposed in Fig. 1. The screen is normally held in this upper position by a bent lever $L^2$, pivoted to the frame-work. The upper end of this lever (or a pin projecting laterally therefrom) plays in a notch or cut-out space in the screen-plate, while the lower end of the lever rests upon a cam $M^2$ on the frame B. When the handle A is pulled forward and the cam $M^2$ thereby carried from under the lever $L^2$, the upper end of the latter is free to be swung rearward and the screen thereupon drops down (a spring being employed to aid gravity, if desired) until the upper end of the lever rests in the upper corner of the notch in the plate, in which position the screen remains, closing the reading-opening and hiding the indicator-wheel, until the handle A is returned to normal position, whereupon the cam $M^2$ rides under the lever $L^2$ again, throws its upper end forward, and lifts the screen to the position shown in the drawings.

Combined with each of the rows of keys or stops M is a series of locking-disks $N^2$, Fig. 4, confined in a guideway between the segmental plates N, which carry the keys, and arranged in line beside the stems of the keys. The stem of each key has upon one side a lug $O^2$. (Shown in dotted lines in Fig. 4.) The entire series of disks $N^2$ in each row does not quite fill the longitudinal space in their guideway, so that the disks can have slight play therein. This is sufficient to permit the lug $O^2$ on any key to pass down between the two disks adjacent to it; but when it is attempted to press down two keys at once their lugs become locked against the intermediate disk or disks. This effectually prevents the simultaneous operation of two or more keys in the same row and is a well-known contrivance for the purpose; but inasmuch as in my machine both rows of keys co-operate with the same actuating pawl and segment it is necessary, or at least desirable, to prevent the operation of two or more keys at once, whether they be in the same or different rows. To this end I so combine the two series of locking-disks with a suitable intermediate device that when any key in one row is pressed in the disks in the opposite row are held from any movement in their guideway, so that they cannot be displaced by any key in their row, and thus all the keys in both rows are locked from operation until the operated key is thrown outward again. A suitable form of intermediate device to be combined with the two series of disks for the above purpose is shown in Figs. 4 and 6. It consists of a cross-bar $P^2$, pivoted at its middle to the frame-work, Fig. 6, and provided at each side of its pivotal point with a forwardly-projecting pin $Q^2$, one of which pins extends into the upper end of the guideway of one of the series of locking-disks $N^2$ and the other into the guideway of the other series of disks. These pins are of such length that when a key in either row is pressed in and its lug $O^2$ displaces the disks on either side of it and forces the disk at each end of the series against the end of the guideway the disk at the upper end of the series will bear against the end of the pin $Q^2$ which projects into the guideway and will force said pin outward, thereby rocking the cross-bar $P^2$ on its pivotal point and throwing the opposite pin $Q^2$ farther into the guideway of the other series of disks, thereby crowding the latter toward the lower end of their guideway and holding them tightly together, so that the lug $O^2$ on no key in their row can be pressed down between them. Thus in Fig. 6 the cross-bar $P^2$ and pins $Q^2$ are in the position they would occupy if a key in the right-hand row were pressed in, at which time all of the keys in the left-hand row would be locked from operation, as will be readily understood.

Inasmuch as the combination of one row of keys with one series of locking-disks in the manner shown is old in the art and inasmuch as the disks are only one of a great variety of well-known forms of locking devices which may be combined with the keys for the same purpose and made to operate in a similar manner, this feature of my invention is not directed to the form of the locking devices, (the disks,) nor to the form or arrangement of the keys, nor the manner of combining a single row of them with a single series of locking-disks, but contemplates, broadly, the combination of the two separate rows of movable stops or keys arranged side by side, a series of locking devices of any sort for each row of keys, (said devices having the general mode of operation of those described,) and a suitable device of any sort intermediate the two series of locking devices, by which when any key in either row is operated the keys in the other row are held from operation by their locking devices.

The base of the machine, (not shown,) upon which the working parts shown in the drawings rest, is to be provided with the usual drawer-compartment containing a sliding money-drawer. This drawer, as is usual in this class of machines, is automatically locked when closed and is automatically unlocked at each operation of the machine and thrown open by a spring. The locking device for the drawer consists of a lever $R^2$, loosely hung upon a shaft $S^2$, Fig. 4. Its rear end extends down into the drawer-compartment and is provided with a locking-shoulder which takes against the front side of the rear wall of the drawer when the latter is closed, and thereby locks the drawer, as indicated by the dotted lines in Fig. 4. At its opposite end, above the shaft $S^2$, the lever $R^2$ is provided with a lug $T^2$, projecting laterally across the front side of an arm $U^2$, also loosely mounted at its lower end upon the shaft $S^2$. Near its upper end this arm $U^2$ is connected by a link $V^2$ to rearwardly-projecting arms or ears $W^2$ on a hub $X^2$, fast on the rock-shaft C. When the operating-handle is pulled forward, the oscillation of the shaft C pulls the upper end of the arm U² forward and its lower portion, bearing against the lug T², lifts the rear end of the lever R² and releases the drawer.

The propelling-spring for the drawer consists of a wire Y², hung at its upper end to the frame-work and having its lower end extended down into the drawer-compartment to bear against the rear side of the drawer. A roller Z², carried by the upper end of the arm U², bears against the rear side of the wire-spring about midway of its length. When the arm U² is pulled forward in the manner before explained, the spring is put under tension, so that when the lever R² is lifted out of engagement with the drawer the latter is thrown open by the spring. Inasmuch as the lug T² on the lever R² does not rest directly against the arm U² when the drawer is closed and the parts are in their normal position of rest, the upper end of the arm U² is moved forward far enough to put the spring under considerable tension before the lever R² is moved and the drawer released. When the drawer is closed again, after the operating-handle has been returned to normal position, the spring offers no resistance to it, and the rear wall of the drawer rides under the rear end of the lever R², whose locking-shoulder then drops down in front of it and locks it, as before described.

To prevent operation of the machine while the cash-drawer stands open, as is generally desirable in this class of machines, I provide a locking device which automatically locks the operating-handle as soon as it is returned to normal position and holds it locked until the drawer is closed. A bell-crank lever B³, Figs. 2 and 4, is loosely mounted upon the shaft S² beside the arms R² and U². The upper end of the vertical arm of this bell crank has a hook C³ formed upon its rear side. This hook co-operates with a lug D³ upon the side of one of the ears W², projecting from the hub X² on the shaft C, Fig. 2. When the upper end of the bell-crank is thrown rearward, the hook C³ moves over the lug D³ and locks the shaft and operating-handle from movement. When it is thrown forward, the lug is free from the hook and the machine can be operated. The rear end of the lower arm of the bell-crank extends down into the drawer-compartment, and when the drawer is closed rests upon the upper edge of the rear wall of the drawer, as indicated by the dotted lines of the drawer in Fig. 4, and holds the upper end of the bell-crank in the forward position shown in the drawings with the hook C³ out of the path of the lug D³, so that the machine is free to be operated. When the operating-handle is pulled forward, however, and the drawer released and thrown open in the manner before described, the rear end of the lower arm of the bell-crank drops a short distance, (until arrested by a hook E³ upon its upper side catching on a cross-plate of the frame-work,) and this throws the upper end of the bell-crank slightly rearward. When the operating-handle and shaft C are now returned to normal position, the lug D³ rides over the nose of the hook C³ as it reaches normal position, pressing the hook forward as it passes, and the hook then catches over the lug and locks the shaft and handle. When the drawer is pushed in again, the rear end of the bell-crank is lifted by the rear wall of the drawer, the hook at the upper end of the bell-crank moved out of the path of the lug D³, as before described, and the machine is ready for another operation.

The full stroke of the operating-handle A in each direction is insured by devices of familiar construction. (Illustrated in Fig. 5.) They consist of a toothed segment F³, fast upon the shaft C, provided with trip-pins G³ H³ and co-operating with a double-toothed pivoted detent-block I³ and spring-latch J³ in the usual well-known manner, which need not be further described.

A gong K³ is sounded by a striker K⁴, Fig. 3, at each operation of the machine. This striker is pivoted to the frame-work at L³ and is held up by a spring-pressed plug M³, confined in a housing on the frame-work and bearing against the under side of the striker. In a tubular housing N³, formed on the striker, is confined a spring and a plug O³, whose upper beveled end projects above the housing. A pin P³, Fig. 1, upon the side of the segment F³ strikes the abrupt front face of the upper end of the plug O³ just before the operating-handle completes a forward stroke and depresses the rear end of the striker against the resistance of the spring-pressed plug M³, and when the pin P³ clears the end of the plug O³ the striker is thrown against the gong K³. In the backward movement of the operating-handle the pin P³ on the segment engages the rear beveled face of the upper end of the plug O³ and presses the latter down into its housing and passes by it without depressing the striker K⁴.

For the purpose, among others, of preventing disputes concerning the amount of money which the customer has tendered in payment for his purchase I have combined with my new machine a novel coin-exposing contrivance containing a series of tilting plates or shelves actuated by the opening and closing of the money-drawer, into which contrivance the money received from the customer is dropped and upon one of whose tilting shelves it remains exposed until the machine is operated to register the succeeding sale. This contrivance is shown in Figs. 8 and 9 and the outline of it as applied to the machine in dotted lines in the front elevation of the machine in Fig. 1. It consists of a casing R³, located at the side of the working parts of the machine and resting upon the base which contains the drawer-compartment, (it being understood that this base and compartment are, as usual, considerably wider than the frame of the machine shown in Fig. 1, said frame being secured upon the base near the middle.) The lower end of the casing opens directly in the drawer-compartment through an opening in the top of the latter. Pivotally mounted within the casing are three tilting shelves $S^3$, $S^4$, and $S^5$. These shelves are connected by links $T^3$ and $T^4$ in such manner that when one shelf is oscillated all are oscillated. A spring $U^3$, connected to the lower end of the lower shelf $S^5$, tends to pull that end of the shelf upward and hold the shelf in horizontal position, in which case the middle shelf $S^4$ would be in a tilted position and the upper shelf $S^3$ in a horizontal position; but when the money-drawer is closed the lower shelf $S^5$ is tilted against the stress of the spring $U^3$ by a bent lever $V^3$ and the middle shelf held in a horizontal position and the upper shelf in a tilted position, as shown in the drawings. This lever is pivoted at its bend to the casing or a cross-rod therein. Its lower end extends down into the drawer-compartment behind the drawer $V^4$ and its upper end bears against the under side of the lower shelf $S^5$ in the rear of its pivotal support. When the cash-drawer is released and thrown open by its spring, as it is at each operation of the machine, in the manner before described, the spring $U^3$ pulls the lower shelf into horizontal position, thereby depressing the upper end of the lever $V^3$ and throwing its lower end forward. When the drawer is pushed in again, its rear side strikes the lower end of the lever and pushes it backward and tilts the shelf $S^5$ to the position shown in the drawings.

There is a glass-covered window $W^3$ in the side of the casing $R^3$ immediately above the middle shelf, and preferably, also, a window $W^4$ in the rear side of the casing at that point. An opening $X^3$ in the upper front side of the casing permits the deposition of the coins. Deflecting-plates $Y^3$, $Y^4$, and $Y^5$, secured to the front wall of the casing and inclined downward and rearward, direct the coins onto the respective shelves.

The operation of this much of the contrivance may be explained as follows: When a sale is made and the clerk receives the money therefor, he first pushes in the proper stops or keys to indicate and register its value and then pulls forward the operating-handle A to its limit of stroke and releases it. This releases the money-drawer and its spring throws it open, whereupon the spring $U^3$ draws the lower shelf $S^5$ into horizontal position and throws the upper shelf $S^3$ into like position and the middle shelf $S^4$ into tilted position. The clerk then drops the coin (assuming that a coin has been tendered in payment of the purchase) into the mouth $X^3$ of the casing $R^3$ and it slides down the deflector-plate $Y^3$ onto the upper shelf $S^3$ and there rests. If any change is required, the clerk takes it out of the cash-drawer and hands it to the customer and then closes the drawer. The closing of the drawer will tilt the upper and lower shelves $S^3$ and $S^5$ again and throw the middle shelf back into horizontal position, whereupon the coin, which is resting upon the upper shelf $S^3$, will drop down upon the middle shelf, and there remain exposed to view through the windows $W^3$ and $W^4$. At the next operation of the machine the opening of the money-drawer will permit the spring $U^3$ to again pull the upper and lower shelves $S^3$ and $S^5$ into horizontal position and tilt the middle one $S^4$, whereupon the coin resting on the middle one will drop down upon the lower one $S^5$. When the drawer is now pushed in again, the lower shelf will be tilted by the lever $V^3$ and the coin will slip off of it and drop down into the money-drawer.

The parts above described constitute a complete and efficient contrivance for the purpose of holding the coin exposed to view until the next operation of the machine and automatically dropping it into the money-drawer; but I prefer to combine with them an automatic door or screen for closing the opening $X^3$ in the casing. This screen is shown as a plate $Z^3$, carried upon the front end of one arm of a bell-crank lever $Z^4$, pivoted at its bend to the casing and having the upper end of its other arm connected by a link $Z^5$ with the rear end of the upper shelf $S^3$. When the money-drawer is closed and this shelf held in the position shown in the drawings, the plate $Z^3$ is thrown down behind the opening $X^3$ and closes it, so that no coins can be deposited nor any access be had to the one resting on the middle shelf $S^4$; but when the money-drawer is opened and the upper shelf $S^3$ thrown into horizontal position the upper arm of the bell-crank $Z^4$ will be pulled rearward and the plate $Z^3$ thrown upward away from the opening $X^3$. The closing of the drawer will again throw the plate down behind the opening to close it. It will be understood that this coin-exposing contrivance may be combined with any machine of this class having a money-drawer which is released and thrown open at each operation of the machine and be made to operate in combination therewith in the manner and for the purpose above described.

It will be understood that the handle A is simply a convenient form of device for applying power to the machine and that the frame B, to which the handle is secured, is simply a support for the actuating-pawl and associated devices. Such being the case, it will be understood that the handle might be secured to the rock-shaft C independently of the frame B, or the shaft might be oscillated by other means than such a handle—as, for instance, by a crank and pitman connection with a revoluble shaft; also, that the actuating-pawl and associated devices might be mounted upon any other suitable oscillating support instead of the frame B; also, that the purpose of making the shaft C oscillatory is to employ it as a medium to transmit oscillatory movement from the operating-handle or other driving device to the various oscillatory parts of the machine, and that so far as the frame B or other support for the actuating-pawl is concerned the shaft might be fixed and the support arranged to oscillate upon it.

I am aware that it has heretofore been proposed to construct a machine embodying as elements a curved slide mounted in guides for driving the indicator and register, a swinging frame moving back and forth beside the curved slide and carrying a pawl arranged to co-operate with a ratchet upon the curved slide, and a series of movable stops or pins adapted to throw the pawl into engagement with the ratchet at different points to cause the swinging frame to move the slide, and consequently the indicator and register, different distances, according to the particular stop or key which is operated; but the construction, arrangement, and combination of parts and their mode of operation in my machine are radically different from those in the machine above referred to, as will be distinctly pointed out in my claims.

I claim—

1. In a cash-register, the combination of an oscillatory segment provided with a ratchet, an actuating-pawl mounted upon a suitable support to travel forward and back beside the segment at each operation of the machine, a series of movable stops or keys co-operating with the pawl during its backward movement to throw it into engagement with the ratchet at different points, and a cam or trip co-operating with the pawl at the end of its backward movement to disengage it from the ratchet of the segment.

2. In a cash-register, the combination of an oscillatory segment provided with a ratchet, an actuating-pawl mounted upon a suitable support to travel forward and back beside the segment at each operation of the machine, a series of movable stops or keys co-operating with the pawl in its backward movement to throw it into engagement with the ratchet at different points, and a cam or trip co-operating with the pawl at the end of its forward movement to throw it into co-operative relation to the keys.

3. In a cash-register, the combination of an oscillatory segment provided with a ratchet, an actuating-pawl mounted upon a suitable support to travel forward and back beside the segment at each operation of the machine, a series of movable stops or keys co-operating with the pawl in its backward movement to throw it into engagement with the ratchet at different points, a cam or trip co-operating with the pawl at the end of its forward movement to throw it into co-operative relation to the keys, and a second cam or trip co-operating with the pawl at the end of its backward stroke to disengage it from the ratchet and throw it out of co-operative relation to the keys.

4. In a cash-register, the combination of an oscillatory segment provided with teeth on its side, an actuating-pawl, and a locking-pawl mounted upon a suitable support to travel beside the segment, and a series of stops or keys co-operating with the pawls to throw them into engagement with the teeth upon the segment.

5. In a cash-register, the combination of an oscillatory segment provided with two ratchets having oppositely-facing teeth, an actuating-pawl co-operating with one ratchet and a locking-pawl co-operating with the other ratchet, both pawls mounted upon a suitable support to travel forward and backward beside the segment at each operation of the machine, and a series of stops or keys co-operating with the pawls to simultaneously throw them into engagement with the ratchets at different points in the backward movement of the pawls.

6. In a cash-register, the combination of an oscillatory segment, a swinging frame co-operating with the segment to restore it to normal position at each forward stroke of the frame, a latch interposed between the segment and swinging frame to lock the two together while the frame is moving the segment to normal position, and a trip co-operating with the latch at the end of the forward movement of the frame to disconnect the latter from the segment.

7. In a cash-register, the combination of the oscillatory segment, the swinging frame co-operating therewith to restore the segment to normal position at each forward stroke of the frame, and a locking device thrown into operative position at the end of the forward stroke of the frame to prevent backward vibration of the segment.

8. In a cash-register, the combination of the oscillatory segment provided with a ratchet, a pawl mounted upon a suitable support to travel beside the segment, and two rows of stops or keys arranged side by side and both co-operating with the pawl to throw it into engagement with the rachet of the segment at different points.

9. In a cash-register, the combination of two rows of stops or keys arranged side by side in radial order to a common axis, two series of laterally-displaceable rolling locking-disks confined in guideways, one co-operating with each row of keys to prevent the simultaneous operation of two or more keys in said row, and a device interposed between the two series of locking-disks and co-operating therewith to cause each series to lock all the keys of its row when any key in the other row is operated.

10. In a cash-register, the combination of the oscillatory segment provided with a ratchet, the rock-shaft, a frame fast thereon and projecting radially therefrom, the operating-handle projecting radially from the frame, the handle and frame constituting a lever for oscillating the rock-shaft, an actuating-pawl, mounted upon the frame to travel beside the segment, and a series of stops or keys co-operating with the pawl during the backward movement of the handle and frame to throw the pawl into engagement with the ratchet at different points.

11. In a cash-register, the combination of the oscillatory segment E, provided with the ratchet K, the swinging frame B, the plate Z, pivotally mounted thereon, the lugs E' and E$^2$ upon the plate Z, and the two parallel rows of keys M, co-operating with the lugs E' and E$^2$, respectively.

12. In a cash-register, the combination of the segment E, provided with the ratchet K, the swinging frame B, the plate Z, pivotally mounted thereon, the lug E$^2$ upon the plate, a row of keys M, co-operating with said lug, the stud C' upon the plate Z, and the cam or trip D$^2$, co-operating with said stud to throw the plate toward the ratchet K, substantially as described.

13. In a cash-register, the combination of the segment E, provided with the ratchet K, the swinging frame B, the plate Z, pivotally mounted thereon, the lugs E' and E$^2$ upon the plate Z, the two rows of keys M, co-operating with the lugs E' and E$^2$, respectively, the stud C' upon the plate Z, and the cams or trips D' and D$^2$, co-operating with the stud C', substantially as described.

14. In a cash-register, the combination of the segment E, provided with the two ratchets K and L, the swinging frame B, the plate Z, and locking-pawl G', pivotally mounted on the frame B, the lug E$^2$ upon the plate Z, and the row of keys M, co-operating with the lug E$^2$, substantially as described.

15. In a cash-register, the combination of the segment E, the swinging frame B, the hook J', carried by the latter and co-operating with the pin L' upon the segment-frame, and the trip P', co-operating with the hook J', substantially as described.

16. In a cash-register, the combination of the segment E, the swinging frame B, co-operating therewith to restore it to normal position at each forward movement of the frame, the locking-plate Q', co-operating with the segment, and the arm W', moving with the frame B and co-operating with the plate Q' to throw it into locking position at the end of the forward movement of the frame, substantially as described.

17. In a cash-register, the combination of the segment E, provided with the ratchet K, an oscillating frame carrying a pawl co-operating with said ratchet, a series of keys co-operating with the pawl, the shaft G, geared to the segment, the indicator-wheel J, geared to the shaft, the sleeve Y', loose upon the shaft, the clutch between the sleeve and shaft, and the registering-wheel Z', fast upon the sleeve, substantially as described.

18. In a cash-register, the combination of the indicator-wheel J, the screen K$^2$, co-operating therewith and having a notch in its supporting-plate, the oscillating frame B, having a cam-surface M$^2$, and the lever L$^2$, interposed between the frame and screen-plate and co-operating with the notch in the latter and the cam-surface on the former, substantially as described.

19. In a cash-register, the combination of the two rows of keys M, radiating from the shaft C and provided with projections O$^2$, the two series of rolling locking-disks N$^2$, confined in guideways N, co-operating with the projections O$^2$ on the keys, and the pivoted cross-bar P$^2$, co-operating at its opposite ends with the locking-disks of the two rows of keys, substantially as described.

20. In a cash-register, the combination of the rock-shaft C, the arm W$^2$, fast thereon and provided with lug D$^3$, the bell-crank lever B$^3$, provided at its upper end with a hook co-operating with the lug D$^3$, and the money-drawer co-operating with the lower end of the lever, substantially as described.

21. In a cash-register, the combination of the rock-shaft C, the arm U$^2$, the link V$^2$, connecting the arm with parts fast upon the rock-shaft, the spring Y$^2$, put under tension by the arm U$^2$, and the locking-lever R$^2$, actuated by the arm U$^2$, substantially as described.

22. In a cash-register, the combination of the gong K$^3$, the striker K$^4$, its actuating-spring, the housing N$^3$ on the striker, the spring and plug O$^3$, confined in said housing, the rock-shaft C, and the pin P$^3$, carried by a support upon the rock-shaft and co-operating with the plug O$^3$, substantially as described.

23. In a cash-register, the combination of the rock-shaft C, the cam R, fast thereon, the lever P, carrying friction-roller Q, resting on cam R, the spring O, connected to the free end of the lever P, the speed-retarding contrivance T, and the link S, connecting the piston-rod thereof with the lever P, substantially as described.

24. In a cash-register, the combination, with the money-drawer, of the tilting shelves S$^3$, S$^4$, and S$^5$, arranged and connected as described and inclosed in a suitable casing provided with a window, and an operative connection between said shelves and money-drawer, whereby the shelves are oscillated at each opening and closing of the drawer, substantially as described.

25. In a cash-register, the combination, with the money-drawer, of the casing R$^3$, opening at its bottom into the drawer-compartment and provided with a window, as W$^3$, the three tilting shelves S$^3$, S$^4$, and S$^5$, arranged therein as described and connected by the links T$^3$ and T$^4$, a spring U$^3$ for oscillating said shelves in one direction, and a lever V$^3$, co-operating with the drawer to oscillate them in the opposite direction, substantially as described.

26. In a cash-register, the combination of the money-drawer, the casing R$^3$, opening at its lower end into the drawer-compartment, having an opening X$^3$ in its upper end and a glass-covered window in its middle portion, the three connected tilting shelves arranged therein as described, the plate $Z^3$ for closing the opening $X^3$, a connection between said plate and one of the tilting shelves for oscillating the plate, and an operative connection between the shelves and money-drawer, whereby the shelves are oscillated at each opening and closing of the drawer, substantially as described.

THOMAS CARNEY.

Witnesses:
PEARL N. SIGLER,
THOMAS CORWIN.